June 17, 1924.  H. S. BEAMESDERFER ET AL  1,498,145
CONTAINER
Filed Aug. 17, 1921
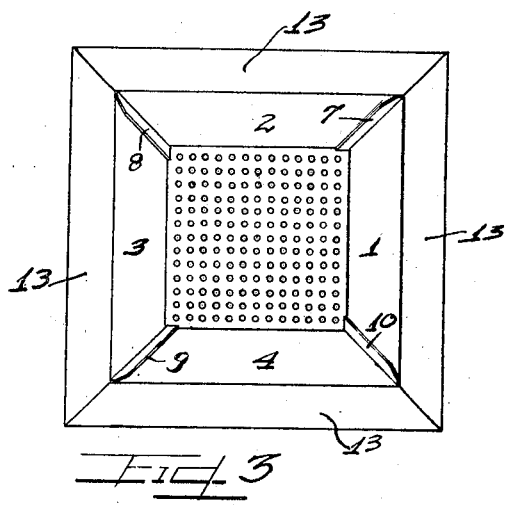
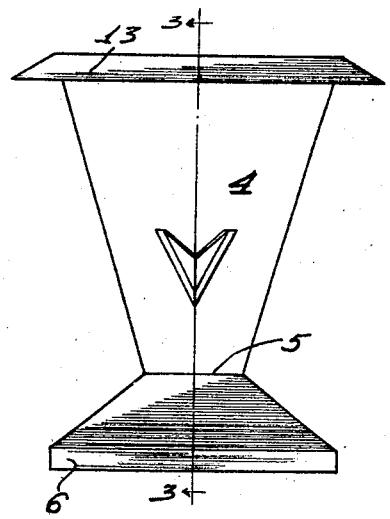
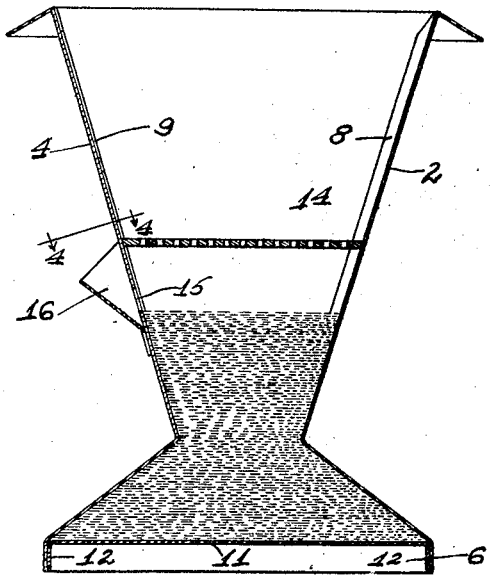
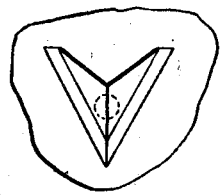

Patented June 17, 1924.

1,498,145

UNITED STATES PATENT OFFICE.

HARVEY S. BEAMESDERFER AND PAUL G. BACHMANN, OF CHICAGO, ILLINOIS.

CONTAINER.

Application filed August 17, 1921. Serial No. 492,959.

*To all whom it may concern:*

Be it known that we, HARVEY S. BEAMESDERFER and PAUL G. BACHMANN, citizens of the United States, and residents of the city of Chicago, in the county of Cook and State of Illinois, have invented certain new and useful Improvements in a Container; and I do hereby declare that the following is a full, clear, and exact description of the same, reference being had to the accompanying drawings, and to the numerals of reference marked thereon, which form a part of this specification.

This invention relates to a container for plants and the like, and particularly to a container which holds a sufficient supply of water to maintain the plant therein in a healthy growing condition for a considerable time.

Containers of the type under consideration are largely used in cemeteries and in extensive floral decorations, and it is highly desirable that they be long lived, easily moved about and of an economical construction. It is also desirable that it be possible to conveniently replenish the supply of water in the container and that the water shall not directly contact the earth in which the plants are growing.

This invention contemplates the fulfillment of the above requirements, and one of the principal objects thereof is the provision of a light weight container which may be economically constructed of durable material.

It is another object of this invention to provide a container of the class described wherein the plant and earth may be easily removed and wherein the water does not directly contact the earth in which the plant is growing.

It is an important object of this invention to provide a container for plants and the like which is provided with means for storing a considerable quantity of water which automatically supplies the plant and which may be conveniently replenished.

Other and further important objects of this invention will be apparent from the disclosures in the specification and the drawings.

The invention (in a preferred form) is illustrated in the drawings and hereinafter more fully described.

On the drawings:

Figure 1 is a front elevation of a container embodying the principles of this invention.

Figure 2 is a top plan view of the container.

Figure 3 is a slightly enlarged section on the line 3—3 of Figure 1.

Figure 4 is a section on the line 4—4 of Figure 3.

Figure 5 is a fragmentary elevation showing the filler spout.

As shown on the drawings:

The upright walls of the container comprise four integral sheets of stamped metal, 1, 2, 3 and 4 respectively, which taper inwardly to form a restricted throat portion 5 and which taper outwardly from said throat portion 5 to vertical base walls 6 which are integral therewith. Said walls 1, 2, 3 and 4 are secured together by means of portions 7, 8, 9 and 10 which are integral with said walls 1, 2, 3 and 4 respectively and which are formed to contact the inner side of an adjacent wall along the edge thereof and are secured thereto by means of soldering, brazing or in other suitable manner. The arrangement just described is best shown in Figures 2 and 3.

Secured inside the base portions 6 is a bottom portion 11 which is formed of stamped metal and provided with downwardly bent vertical flanges 12 which are secured to the inside of said base portion 6. Suitable flanges 13 are formed on the upper edges of the walls 1, 2, 3 and 4, the abutting corners of said flanges being mitered to interfit with each other and being secured together in any suitable manner. Removably secured inside the walls 1, 2, 3 and 4 about midway between the top and bottom thereof is an apertured false bottom 14 which is adapted to support the plants and the earth in which they are growing within the container.

By inwardly tapering the walls 1, 2, 3 and 4, the earth contained therein is caused to continually settle on the false bottom 14, and as a result of this settling is always properly packed about the roots of the plants.

Formed in the wall 3 a short distance below the false bottom 14 is an aperture 15, and surrounding said aperture is a stamped metal spout 16 which is of a form shown in Figures 1, 3, 4 and 5 and which is formed of stamped metal which is secured to the outside of the wall 3 by soldering or in any other suitable manner. The top of said spout 16 preferably slants downwardly so that a hose or other filling device may be conveniently inserted therein, and said spout and the aperture 15 thereby afford convenient means whereby water may be introduced into the base of the container to be supplied to the earth above the false bottom 14 to keep the earth sufficiently moist to maintain plants therein in a healthy growing condition. On account of the fact that the mouth of the spout 16 is below the bottom of the false bottom 14, there is no danger of bringing the water in the container to such a level that it contacts the earth above the false bottom, and on account of this arrangement there is no washing away of the earth, the moisture to the earth being solely by evaporation of the water in the base.

It will be apparent from the foregoing description that this invention provides a container which may be economically manufactured which is adapted to hold a sufficient supply of water to last for a considerable time, and which may be conveniently and quickly filled with water to the proper level without danger of directly contacting the earth in which the plants in the container are growing with the water. Since the construction is of stamped metal, which is preferably treated by galvanizing or enameling, the container is light and at the same time is durable and may be economically manufactured. On account of the fact that the side walls are secured together on the inside of the container, the same presents a neat outward appearance.

We are aware that many details of construction may be varied without departing from the principles of this invention, and we therefore do not purpose limiting the patent granted otherwise than necessitated by the prior art.

We claim as our invention:

A stamped metal container comprising side walls, an integral flange on each of the side walls secured to the wall adjacent thereto, a vertical flange on each side wall affording a base portion, a bottom portion having integral flanges secured to the inside of the flanges affording said base portion, an opening for introducing liquid into the container at a point above said bottom portion, and an apertured false bottom removably mounted in the container above said opening.

In testimony whereof, we have hereunto subscribed our names in the presence of two subscribing witnesses.

HARVEY S. BEAMESDERFER.
PAUL G. BACHMANN.

Witnesses:
CHARLES W. HILL, Jr.,
CARLTON HILL.